US011113628B2

(12) United States Patent
Bahrs et al.

(10) Patent No.: US 11,113,628 B2
(45) Date of Patent: *Sep. 7, 2021

(54) SELF-LEARNING CONTEXTUAL MODALITY SELECTION FOR COGNITIVE SOLUTION DELIVERY

(71) Applicant: International Business Machines Corporation, Armonk, NY (US)

(72) Inventors: Peter C. Bahrs, Williamson, TX (US); Paul K. Bullis, Cedar Park, TX (US); Geoffrey M. Hambrick, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 930 days.

This patent is subject to a terminal disclaimer.

(21) Appl. No.: 15/851,315

(22) Filed: Dec. 21, 2017

(65) Prior Publication Data
US 2019/0138945 A1 May 9, 2019

Related U.S. Application Data

(63) Continuation of application No. 15/803,927, filed on Nov. 6, 2017.

(51) Int. Cl.
*G06N 20/00* (2019.01)
*G06N 5/04* (2006.01)

(52) U.S. Cl.
CPC ............ *G06N 20/00* (2019.01); *G06N 5/043* (2013.01)

(58) Field of Classification Search
None
See application file for complete search history.

(56) References Cited

U.S. PATENT DOCUMENTS

| 10,394,804 | B1* | 8/2019 | Podgorny | G06F 16/958 |
| 2011/0282749 | A1* | 11/2011 | Pradeep | G06Q 30/02 |
| | | | | 705/14.66 |
| 2015/0178392 | A1* | 6/2015 | Jockisch | G06F 16/9535 |
| | | | | 707/706 |
| 2015/0310377 | A1* | 10/2015 | Schlumberger | ............ |
| | | | | G06Q 10/063114 |
| | | | | 705/7.15 |
| 2017/0006161 | A9* | 1/2017 | Riahi | H04M 3/5235 |
| 2019/0034959 | A1* | 1/2019 | Pradeep | A61B 5/165 |

OTHER PUBLICATIONS

Appendix P, 2017.

* cited by examiner

*Primary Examiner* — Alan Chen
(74) *Attorney, Agent, or Firm* — Garg Law Firm, PLLC; Rakesh Garg; Alexander Jochym

(57) ABSTRACT

A problem context is computed from an input at an application. The problem context includes a set of problem factors, the input including a problem to be solved using a cognitive system. A user context is computed from the input at the application, the user context including a set of user factors. A type of media is determined corresponding to a complexity of a cognitive solution received from the cognitive system, where the cognitive solution is in response to the problem. Using a problem factor from the set of problem factors, using a user factor in the set of user factors, and the complexity, a mode of communication is determined. A communication apparatus is adjusted to cause a data communication to occur and deliver the cognitive solution in the type of media using the mode of communication.

14 Claims, 6 Drawing Sheets

SELF-LEARNING CONTEXTUAL MODALITY SELECTION FOR COGNITIVE SOLUTION DELIVERY

TECHNICAL FIELD

The present invention relates generally to a method for delivery of solutions from cognitive systems. More particularly, the present invention relates to a method for self-learning contextual modality selection for cognitive solution delivery.

BACKGROUND

A cognitive system (also known as a "question and answer system" or a "Q and A system") is an artificial intelligence application executing on data processing hardware. Cognitive systems are in a category of technologies that uses natural language processing and machine learning to enable people and machines to interact more naturally to extend and magnify human expertise and cognition. These systems learn from an available body of knowledge (knowledgebase) and answer questions and queries pertaining to the subject-matter domain of the knowledgebase by analyzing the relationships and significant aspects that are expressed in or inferable from the knowledgebase. For example, a knowledgebase of a domain can include structured repositories of domain-specific information, such as ontologies, taxonomies, or unstructured data related to the domain, or a collection of natural language documents about the domain.

A cognitive system can also use deep learning and other cognitive techniques to perform sentiment analysis on a given information input. For example, the sentiment analysis can analyze and extract a linguistic tone of the information input, a like or dislike and a degree thereof expressed in the information input, a main subject or a topic being discussed or described in the information input, and many other language-based features of the information input. The information input is human-usable natural language input, such as a natural language text, audio of a human speech, a video or an image of human facial expressions or other bodily gestures, and the like.

SUMMARY

The illustrative embodiments provide a method that computes, at an application executing using a processor and a memory, from an input, a problem context, the problem context comprising a set of problem factors, the input comprising a problem to be solved using a cognitive system. The embodiment computes, at the application, from the input, a user context, the user context comprising a set of user factors. The embodiment determines a type of media corresponding to a complexity of a cognitive solution received from the cognitive system, wherein the cognitive solution is responsive to the problem. The embodiment determines, using a problem factor from the set of problem factors, using a user factor in the set of user factors, and the complexity, a mode of communication. The embodiment adjusts a communication apparatus to cause a data communication to occur, wherein the data communication delivers the cognitive solution in the type of media using the mode of communication.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
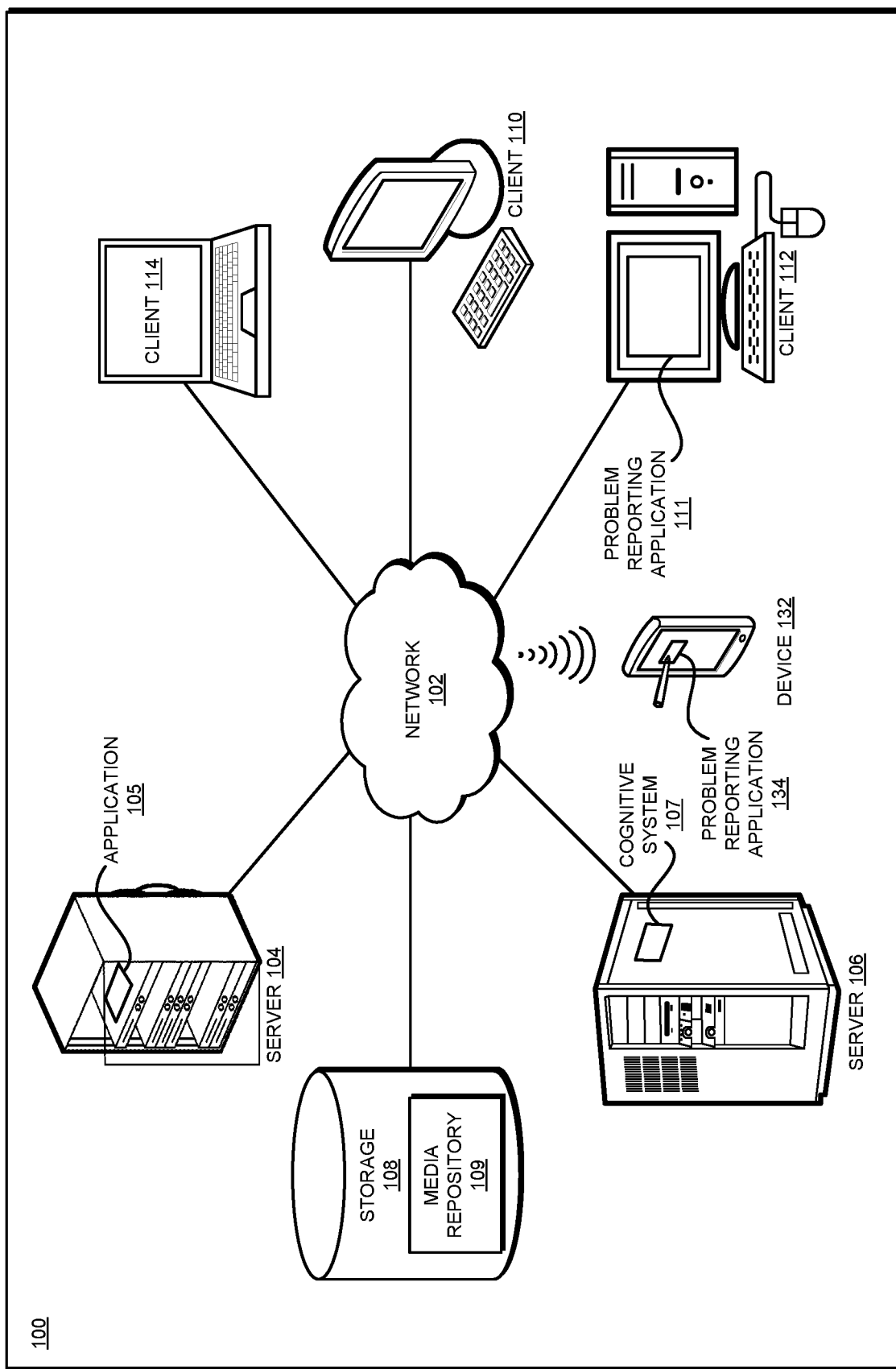
FIG. 1 depicts a block diagram of a network of data processing systems in which illustrative embodiments may be implemented.

Cognitive systems are presently used in a variety of service areas, including for providing automated support services. As a non-limiting example, consider the specific service area of technical support for computer hardware, software, and services. Users—who can be humans, computer systems, devices, or software applications—submit technical issues (problems, questions) for which a solution is needed. For a received problem, cognitive system analyzes the technical nature of the problem, computes a solution based on the cognitive system's training and knowledgebase, and outputs the computed solution (content, answers). The solution is then delivered to the user who submitted the problem.

The accuracy and applicability of the computed solution to the submitted problem is only one of the major considerations in determining the effectiveness of cognitive systems-based technical support. The illustrative embodiments recognize that user-satisfaction from cognitive systems-based technical support includes another significant factor that is often overlooked. The illustrative embodiments recognize that a manner or modality in which the solution is delivered to the user is such an overlooked factor in user-satisfaction from cognitive support services.

A mode of delivery includes a form in which the content is presented, and a method by which the that form of content is delivered. Some non-limiting examples of the form in which the content is presented include textual data, audio file or stream, video file or stream, graphical data or presentation, an image, animation, reference to source or information external to the presented content, or some combination of these and many other forms. Similarly, some non-limiting forms of delivery of the content include short message service (SMS, or texting), email, blog entry, automated voice call, collaborative presentation of a collaboration platform, interactive video presentation, uploading of data to a destination, referencing existing or recently placed data within an application or system experiencing the problem, or some combination of these and many other forms. Collectively, the form of the content (of a cognitive solution) and the method of delivery of that form (of the cognitive solution) is referred to herein as a "modality" of a solution.

The illustrative embodiments recognize that a modality of a solution is a user-satisfaction factor that is highly variable and contextually sensitive. As one example, a modality of a solution for one problem may be acceptable under one circumstance of the problem but not in another circumstance of the same problem. For example, a solution guide delivered as an interactive tool is successful in achieving high user-satisfaction when the user has access to the system experiencing the problem for applying the solution. The same solution is frustrating when the user—e.g. a system administrator—is not at a place or time when access to the affected system is readily available.

As another example, a solution guide delivered as a heavy video file or stream may be successful in achieving high user-satisfaction when the user has access to a high bandwidth data network. The same solution receives low user-satisfaction marks when the solution is delivered to a mobile device of the user while the user is traveling, has limited data connectivity, or both.

Conversely, as another example, a solution guide delivered as a short textual answer message may be successful in achieving high user-satisfaction when the user is traveling, has limited data connectivity, or both. The same solution receives low user-satisfaction marks when the user has access to a high bandwidth data network, is near the affected system, or both.

As another example, a solution guide delivered as a short data file with external references may be successful in achieving high user-satisfaction when the user has reported the problem with a normal range of emotions, sentiments, or mood. The same solution may receive low user-satisfaction marks when the solution is delivered to an upset user, and a comprehensive self-contained graphical presentation would have been more successful in desirably shifting the user's upset mood.

Many other such examples illustrate the need for appropriate solution mode selection. For example, if the user is visually impaired, an audio solution is more satisfactory than a video solution; a user's personality might want a lot of text to read rather than cryptic short answers; a tactical skilled user might be better at absorbing video quickly rather than reading text; a Spanish language speaker might prefer a short text in Spanish to a detailed video in English; and many other such circumstances where the success of the solution is heavily dependent are dependent upon the modality of the solution.

As can be seen from these non-exhaustive examples, the effectiveness of a cognitive solution—even if the solution is correct—is highly dependent upon the modality of the solution. A correct solution delivered with an undesirable modality can be as ineffective in solving the problem as an incorrect solution in some cases. A partially correct solution delivered with the right modality can be more effective in improving a user's satisfaction with the solution than a completely correct solution delivered with the wrong modality.

The illustrative embodiments recognize that prior-art methods of delivering cognitive solutions are not configured to adapt the modality of the computed solution according to the context of the problem, context of the user, or both. A context of the problem is a manner in which the problem is reported to the cognitive system. Some non-limiting examples of problem contexts, to wit, the mode or manner in which the problem is reported, include—a log file dump, a screenshot containing graphical and/or textual information, an email communication, a completed trouble ticket form, a text message sent to a support number, an audio message recorded at a support facility, a video clip uploaded to the support facility, a file transferred to the support facility, a graphical image uploaded or downloaded, or a combination of these and other modes.

A context of a user is a circumstance under which the user is performing the reporting of the problem in the particular manner of reporting. Some non-limiting examples of user contexts, to wit, circumstances of the user existing at problem reporting, include—a location or a change in location (e.g., traveling) of the user, proximity of the user to the affected system, a type of data network over which the user is reporting the problem, a time-delay after the occurrence of the problem after which the user is reporting the problem, a tone or sentiment adopted by the user in reporting the problem, a personality of the user, a learning style of the user, a number of repeated reports by the user over time, a change in tone or sentiment of the user over time, a level of detail in which the user is reporting the problem (e.g., brief text, detailed description, or video clip), or a combination of these and many other circumstances.

The illustrative embodiments further recognize that the modality of a cognitive solution is also dependent upon a complexity of the solution. For example, a solution that calls for a change in a parameter value in a system to remedy the problem may be sufficiently communicated via an email message (assuming no visual impairment or language deficiency), another solution that requires extensive multi-step reconfiguration of the system might benefit from a step-by-step graphical presentation. As another example, a user with a limited capability device, e.g., a smartphone, might prefer that an involved solution be delivered as an audio narration versus a simple solution be delivered as a short text message. Generally, the illustrative embodiments recognize that the complexity of a solution is usable in selecting a modality for the solution such that the modality is suitable for communicating the solution of that complexity, in combination with the user and problem contexts.

Therefore, the illustrative embodiments recognize that once a cognitive solution has been computed, selecting the right modality for delivering that solution is an important issue that requires a novel method for dynamic modality selection. Furthermore, the dynamic nature of the modality selection should be responsive to a problem context, a user context, or both.

The illustrative embodiments recognize that the presently available tools or solutions do not address these needs/problems or provide adequate solutions for these needs/problems. The illustrative embodiments used to describe the invention generally address and solve the above-described problems and other related problems with self-learning contextual modality selection for cognitive solution delivery.

An embodiment can be implemented as a software application. The application implementing an embodiment, or one or more components thereof, can be configured as a modification of an existing cognitive system—i.e., a native application in the cognitive system, as an application executing in a data processing system communicating with an existing cognitive system over a short-range radio network such as Bluetooth, over a wired or wireline local area network (LAN)—i.e., a local application on the LAN, as an application executing in a data processing system communicating with an existing cognitive system over a wide area network (WAN)—i.e., a remote application on the WAN, as a separate application that operates in conjunction with an existing cognitive system in other ways, a standalone application, or some combination thereof.

An embodiment receives or intercepts an input where the input is a problem submission to a cognitive system. The embodiment determines a problem context of the input, including but not limited to a mode of the input. The embodiment also determines a user context from the input. The embodiment passes the input, or allows the input to pass, to the cognitive system.

An embodiment receives or intercepts an answer/solution produced from the cognitive system. The embodiment performs an answer complexity analysis. In one embodiment, the complexity analysis counts a number of steps and the complexity factor of the solution is a function of the number of steps. In another embodiment, the complexity factor of the solution is a function of a length of the solution. In another embodiment, the complexity factor of the solution is a function of a length of one or more steps of the solution. In another embodiment, the complexity factor of the solution is a function of a number of data points or variables included in the solution. In another embodiment, the complexity factor of the solution is a function of a level of expertise or authorization needed to implement the solution. In another embodiment, the complexity factor of the solution is a function of degree of prevalence or uniqueness of the problem, the solution, or both. In another embodiment, the complexity factor of the solution is a function of a number of alternatives available of the solution. In another embodiment, the complexity factor of the solution is a function of an amount of data or knowledge utilized by the cognitive system in computing the solution. Generally, the complexity factor of a solution can be a function of these example characteristics of the solution, many other characteristics similarly discernible from a solution, or a combination thereof.

These examples of solution characteristics for complexity determination are not intended to be limiting. From this disclosure, those of ordinary skill in the art will be able to conceive many other solution characteristics and methods for determining the complexity factor of a solution, and the same are contemplated within the scope of the illustrative embodiments.

An embodiment configures a repository of solutions to operate in conjunction with the cognitive system, such that the cognitive system populates the repository with solutions. The repository can be populated with precomputed solutions, solutions computed in response to problems reported to the cognitive system, or both.

Furthermore, the embodiment configures the repository such that a solution stored therein is stored or storable in more than one media forms. In other words, the embodiment causes one or more media forms of the content of the solution to be produced and stored in the media repository.

A media form of a solution is a form in which the content is presented, as described herein. Media (or medium) of a solution include but are not limited to textual data, audio file or stream, video file or stream, graphical data or presentation, an image, animation, reference to source or information external to the presented content (e.g., a Uniform Resource Locator (URL)), or some combination of these and many other forms. The media repository stores a solution in one or more media forms.

Furthermore, a solution in a particular media can be extracted from the media repository and delivered using any form of content delivery. As described herein, some example forms of delivery of the content include short message service (SMS, or texting), email, blog entry, automated voice call, collaborative presentation of a collaboration platform, interactive video presentation, uploading of data to a destination, referencing existing or recently placed data within an application or system experiencing the problem, or some combination of these and many other forms. A selected media form of the solution together with a selected method of delivering that media forms the modality of the solution.

An embodiment selects a suitable media form of the solution from the repository. For example, the media selection can be done based on the complexity of the solution, a context of the problem, a context of the user, a preference of the user, a preference of a group of which the user is a member, or a combination thereof. The application determines whether the selected media type is available for that solution in the repository. In one case, the embodiment causes an unavailable media form to be created from the solution. The selection or creation of a media form of the solution is based on the cognitive analysis of the preferred modality given the context in which the solution is to be delivered and used.

Once a media form of the solution is selected, an embodiment further determines whether the media form creates the correct modality of the solution according to the solution complexity, one or more preferences, one or more contexts—i.e. cognitively determined user-specific circumstance or a situation in which the solution has to be delivered and/or used, or a combination thereof. For example, even if the solution complexity and/or the user preference indicate a suitability of an interactive presentation media form, a user context that the user has a low bandwidth connection might cause the embodiment to conclude that the selected media form renders the modality of the solution unsuitable in the user context.

The suitability of a media form to determine the correct modality of the solution can be accomplished in this manner using various combinations of the contextual factors, preference values, complexity factors, and other factors that will be conceivable from this disclosure. The embodiment may reject a selected media form of the solution as a result of this modality computation. The embodiment may select a different media form from the repository that are better responsive to one or more factors in the modality consideration. The media form of the solution and a method of communication for that media form result in the modality of the solution that the embodiment delivers to the user using the method of communication.

An embodiment further evaluates the effectiveness of the modality of the solution that is delivered. For example, one embodiment instruments the solution with evaluation code such that the evaluation code executes on the receiving system that receives the solution. The evaluation code can measure one or more effectiveness factors such as, but not limited to, amount of time elapsed in receiving (e.g., downloading) the solution in the selected modality, a failure or retry required in receiving the solution in the selected modality, amount of time the user spent using or consuming the solution in that modality, a number of times the user reviewed the solution in that modality, whether the user visited an external link embedded in the solution, user feedback about the success of the solution in solving the problem, user feedback about an effectiveness of or user-satisfaction from the modality of the solution, and many others.

The effectiveness of the modality of the solution can change in a dynamic environment. For example, it is often the case that a $2^{nd}$ through $N^{th}$ user might take over for any number of reasons from an initial user who was considered in the context—e.g., when the initial user becomes ill, goes on vacation, a skill demand changes, the initial user becomes unavailable or unsuitable for other reasons. These and other similar situations reset the context for the new user while still provide the historical context interactions. The evaluation code can continue to measure one or more effectiveness factors when such a change of context occurs and provide historical context as well as current context information.

The evaluation code returns to an embodiment one or more measurement values. The embodiment uses a measurement value in a function to compute a weight or influence attributed to one or more factors that were used in the selection of one or more aspects of the modality of the solution. For example, if the measurement value indicates that the modality succeeded in increasing a user-satisfaction with the modality of the solution, the embodiment either leaves an influence of a factor unchanged, reinforces (increases) the influence of a factor, decreases an influence of another factor, or some combination thereof. Conversely, if the measurement value indicates a dissatisfaction with, or unsuitability of, the modality of the solution, the embodiment may decrease the influence of a factor, increase the influence of another factor, or both. In this manner, an embodiment causes a cognitive support system to self-learn from previously delivered modalities of solutions and to improve the modality selection of a future selection.

The manner of self-learning contextual modality selection for cognitive solution delivery described herein is unavailable in the presently available methods. A method of an embodiment described herein, when implemented to execute on a device or data processing system, comprises substantial advancement of the functionality of that device or data processing system in delivering cognitive solutions with modalities that improve user-satisfaction, effectiveness of the solution, or both.

The illustrative embodiments are described with respect to certain types of cognitive systems, support services, problems, solutions, modalities, media forms, factors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
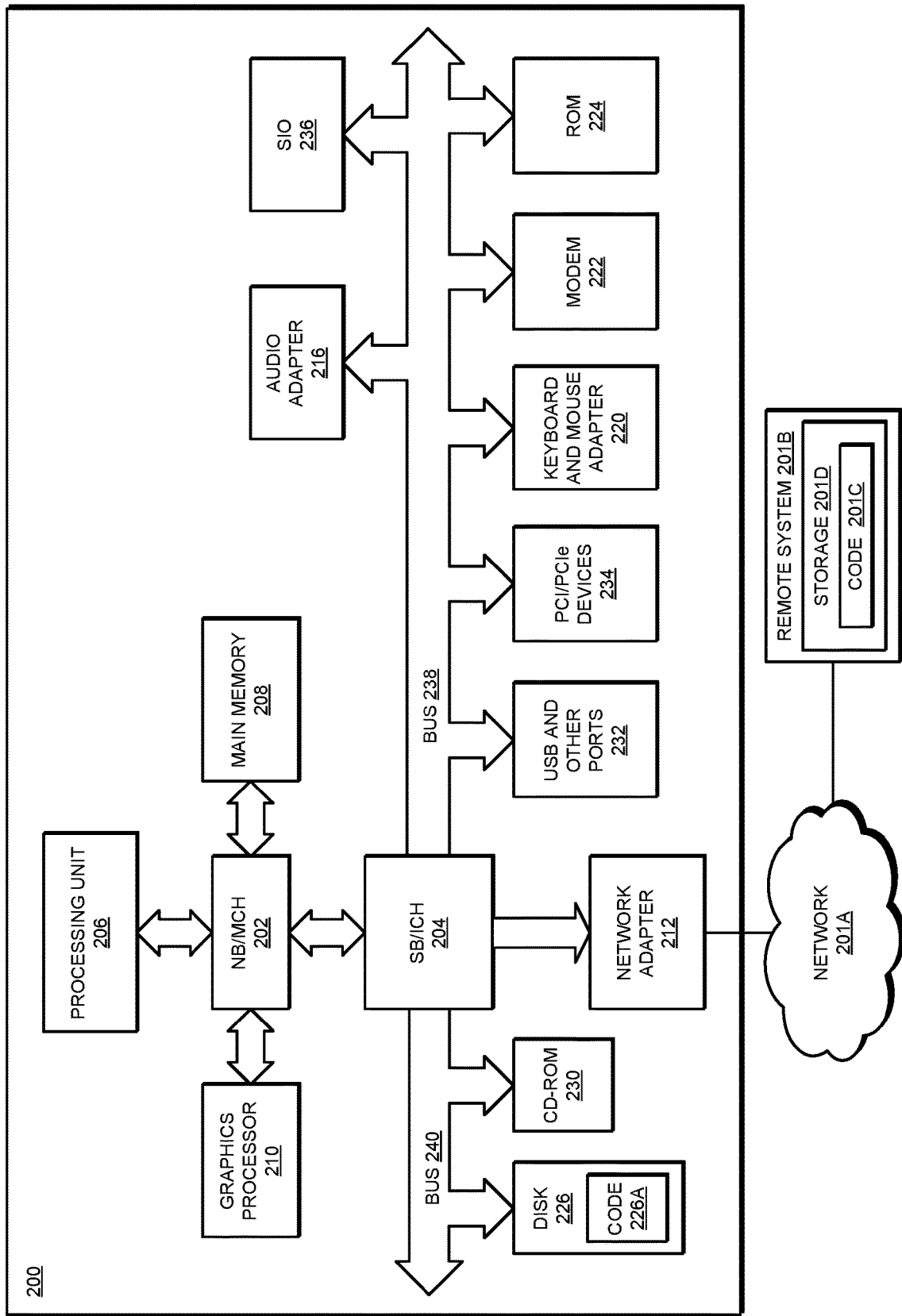
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Cognitive system 107 is an example of a cognitive system providing automated services, such as, but not limited to, technical support service. Repository 108 stores one or more media forms 109 of one or more cognitive solutions computed by cognitive system 107. App 134 and 111 are example applications used for providing an input—e.g., reporting a problem—to cognitive system 107. Evaluation code embedded in a solution and delivered by application 105 may operate in or with apps 134 and 111, in a manner described herein. A device or data processing system where apps 134 or 111 execute is assumed to be capable of using the modality in which the solution is delivered—e.g., capable of playing back audio or video, receiving text messages, etc.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
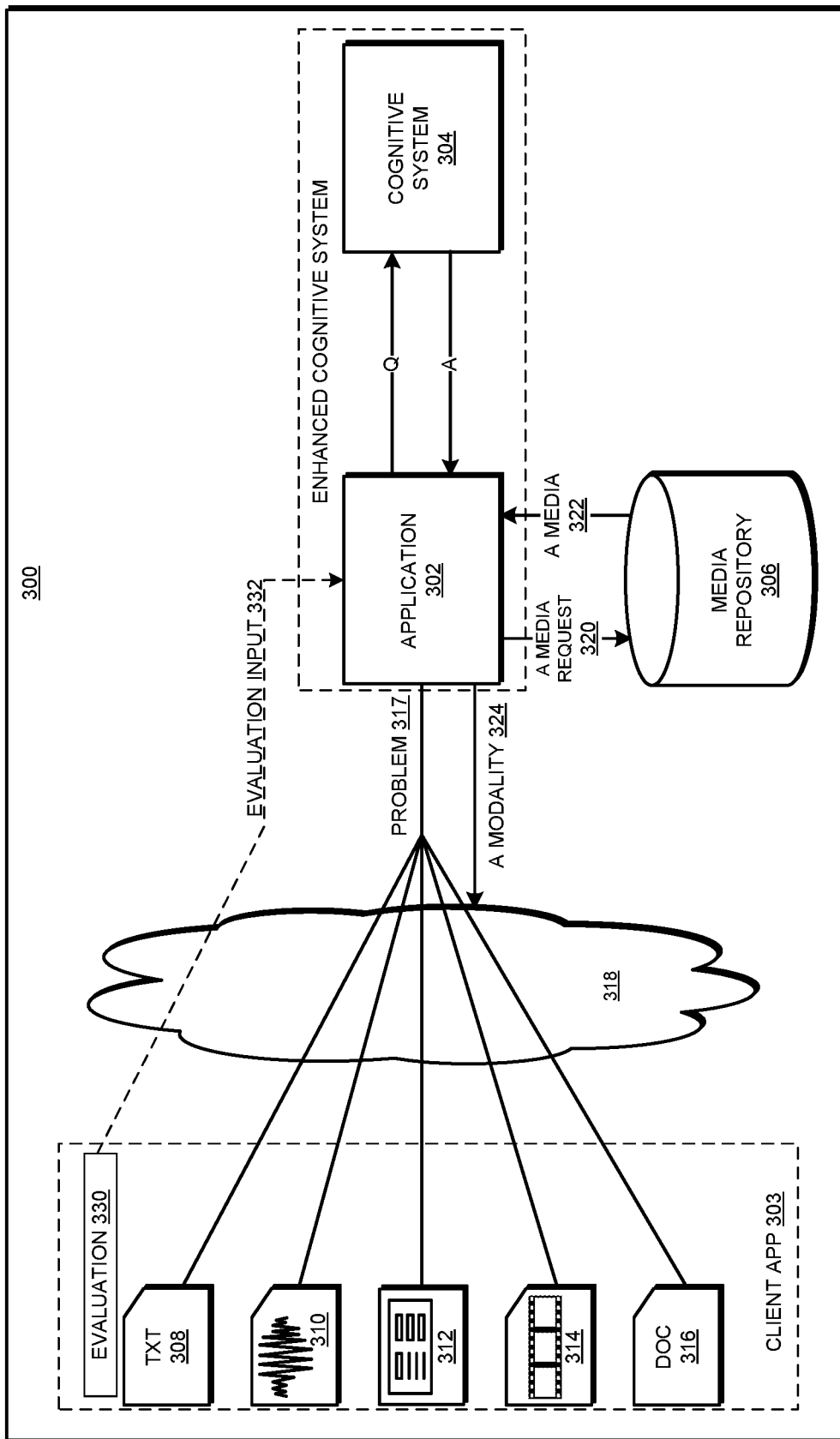
FIG. 3 depicts a block diagram of an example configuration for self-learning contextual modality selection for cognitive solution delivery in accordance with an illustrative embodiment.

With reference to FIG. 3, this figure depicts a block diagram of an example configuration for self-learning contextual modality selection for cognitive solution delivery in accordance with an illustrative embodiment. Application 302 is an example of application 105 in FIG. 1. Client app 303 is an example of apps 134 or 111 in FIG. 1. Cognitive system 304 is an example of cognitive system 107 in FIG. 1. Media repository 306 comprises one or more media forms of one or more cognitive solutions in the manner of repository 109 in FIG. 1. Application 302 operating together with cognitive system 304 forms a context-aware enhanced cognitive system that is capable of selecting a solution modality in a context-aware manner in accordance with the illustrative embodiments.

An input from client app 303 can take the form of textual data 308, audio data 310, graphical data 312, video data 314, or document 316 containing a mix of these or various other types of data. Such an input forms problem 317 and is received over data network 318 from a problem reporting app, e.g., apps 134 or 111 in FIG. 1.

Input 317 may itself comprise question Q for cognitive system 304, or application 302 may transform input 317 into question Q for cognitive system 304. Cognitive system 304 returns answer A (solution). Based on the complexity of answer A, context of problem 317, context of a user sending problem 317, or a combination of these and other factors, application 302 sends request 320 to repository 306. Request 320 is a request for a particular media form of answer A. Responsive to request 320, repository 306 returns solution media 322 (A media). After selecting a suitable A media 322, application 302 transmits the solution with a modality (A modality 324). Solution with modality 324 is transmitted over a suitable path through network 318 to the user/sender of problem 317.

Evaluation component 330 operates in client app 303 to evaluate the effectiveness of modality 324. Evaluation component 330 provides evaluation input 332 to application 302. Application 302 uses evaluation input 332 to learn the effectiveness of the modality in the context to improve a modality selection in subsequent operations.

Figure 4:
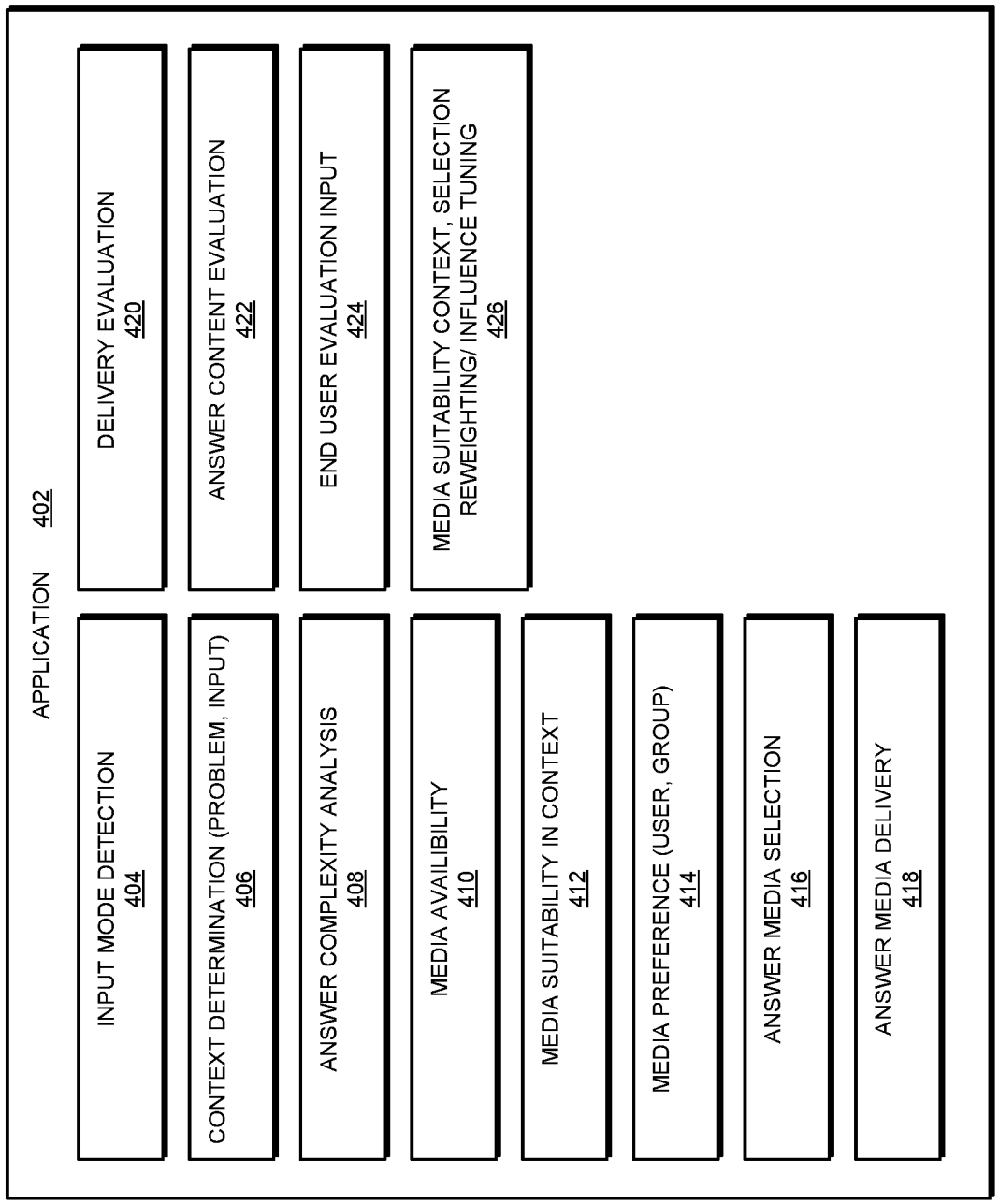
FIG. 4 depicts a block diagram of an example application for self-learning contextual modality selection for cognitive solution delivery in accordance with an illustrative embodiment.

With reference to FIG. 4, this figure depicts a block diagram of an example application for self-learning contextual modality selection for cognitive solution delivery in accordance with an illustrative embodiment. Application 402 is an example of application 302 in FIG. 3.

Application 402 includes component 404, which analyzes an input, such as input 316 in FIG. 3, for detecting the mode of the input. Component 406 computes contextual factors and their values for a user context associated with a sender of the input, and/or a problem context associated with the problem that caused the input to be transmitted.

Component 408 analyzes a complexity of the solution or answer produced by the cognitive system, e.g., cognitive system 304 in FIG. 3. Component 410 determines whether a media compatible with the complexity is available in a media repository, e.g., repository 306 in FIG. 3. Optionally, component 410 causes an unavailable media to be created.

Component 412 determines whether the media type selected for the complexity of the solution is actually suitable in the given context (user context and/or problem context), as described herein. Component 414 manages the preferences of users and user-groups, where the preferences are also usable in selecting the correct modality of the solution.

Depending upon the complexity, contextual factors, and preferences component 416 selects a suitable media form of the solution. Component 418 selects a suitable method of communicating the selected media form. Thus, the modality of the solution is determined by application 402. Component 418 delivers the solution with the determined modality.

Optionally, component 418 can be configured to instrument the solution with evaluation code, which operates in a manner described herein. In some cases, an end-user feedback input can be received by means other than the embedded evaluation code, e.g., through a feedback website, or through a provision for feedback input in apps 134 or 111.

Component 420 computes an effectiveness of the solution delivery in the selected modality. For example, component 420 uses one or more effectiveness factor values collected in a manner described herein. If any of the effectiveness factor values are directed towards the effectiveness or usefulness of the content of the solution, component 422 performs that part of the evaluation. When an evaluation feedback input is provided by the end-user through means other than the instrumented evaluation code, component 424 imports and processes those feedback inputs to perform the effectiveness evaluation.

Based on the evaluation, application 402 enables the cognitive system for self-learning. Particularly, component 426 adjusts an influence or weight of a contextual factor, a preference, an input mode, or a combination thereof, in the process of selecting the media form of the solution, setting the mode of communicating that media form, or both.

Figure 5:
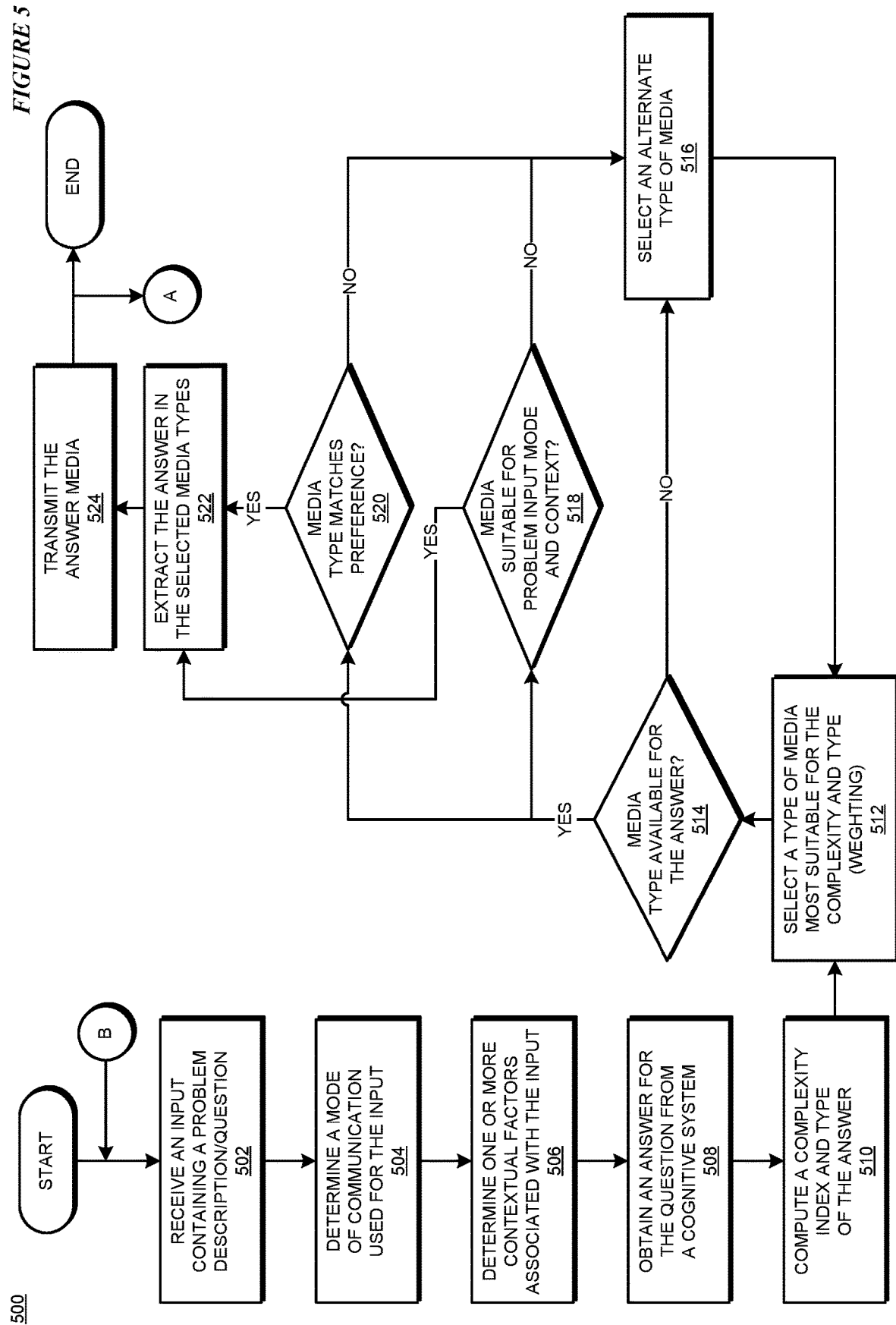
FIG. 5 depicts a flowchart of an example process for self-learning contextual modality selection for cognitive solution delivery in accordance with an illustrative embodiment.

With reference to FIG. 5, this figure depicts a flowchart of an example process for self-learning contextual modality selection for cognitive solution delivery in accordance with an illustrative embodiment. Process 500 can be implemented in application 402 in FIG. 4.

The application receives an input containing a problem description or question (block 502). The application determines a mode of communication of the input (block 504). The application determines one or more contextual factors associated with the input (block 506).

The application obtains a cognitive answer for the question (block 508).

The application computes a complexity metric or index corresponding to the type of the answer as well as the particular answer (block 510). The application uses one or more contextual factors, preferences, and complexity metrics according to a preconfigured influence or weight to select a type of media most suitable for the solution (block 512).

The application determines whether the selected media type is available for the answer in the repository (block 514). If the selected media type is not available ("No" path of block 514), the application selects an alternate type of media (block 516). If the media type is available ("Yes" path of block 514), the application may make one or more further determinations.

For example, the application determines whether the selected media type is compatible with the contextual factors and input mode (block 518). If the selected media type is incompatible with the contextual factors or input mode ("No" path of block 518), the application selects an alternate type of media (block 516). If the selected media type is compatible with the contextual factors or input mode ("Yes" path of block 518), the application proceeds to block 522.

Similarly, the application may also, or alternatively, determine whether the selected media type is compatible with a preference of the user or a group (block 520). If the selected media type is incompatible with the preference ("No" path of block 520), the application selects an alternate type of media (block 516). If the selected media type is compatible with the preference ("Yes" path of block 520), the application proceeds to block 522. The application thus selects a suitable media type for the cognitive solution.

The application extracts the selected media type of the solution from the repository (block 522). The application transmits the solution in the selected media using a form of communication determined from the context and input mode (block 524). Optionally, the application instruments the solution with evaluation code at block 524, as described herein. The application ends process 500 thereafter, or exits via exit "A" to enter process 600 of FIG. 6 at corresponding entrance "A".

Figure 6:
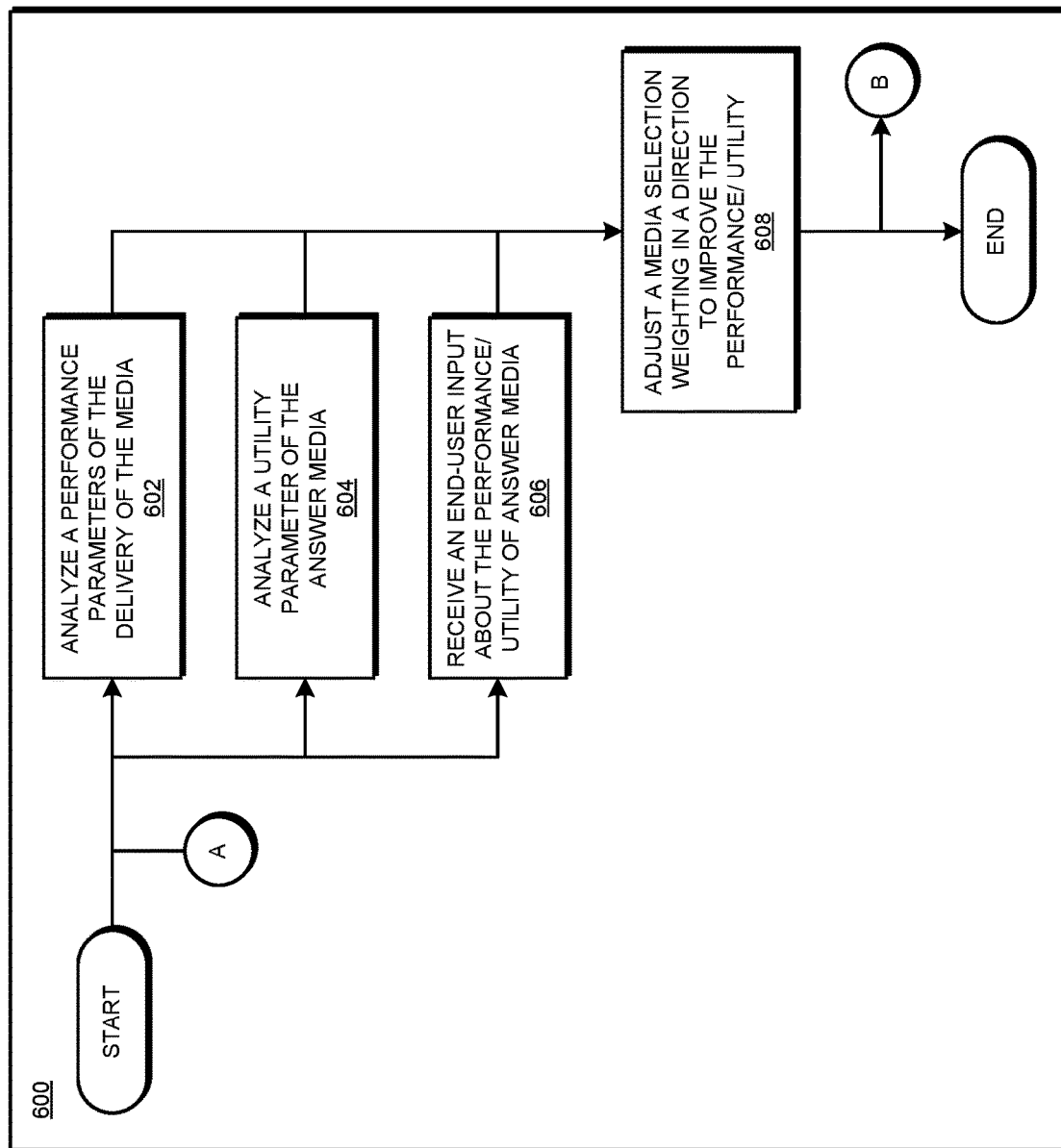
FIG. 6 depicts a flowchart of an example process for self-learning in accordance with an illustrative embodiment.

With reference to FIG. 6, this figure depicts a flowchart of an example process for self-learning in accordance with an illustrative embodiment. Process 600 can be implemented in application 402 in FIG. 4.

The application may take one or more paths to self-learning in process 600. For example, the application may receive an evaluation input, e.g., from an evaluation code instrumentation in the solution, which is directed towards the performance of the delivery of the solution media, as experienced on the receiving end. Using such an evaluation input, the application analyzes a transmission method performance parameter of the delivery (block 602).

As another example, the application may receive an evaluation input, e.g., from an evaluation code instrumentation in the solution, which is directed towards a utility the solution media, as experienced on the receiving end. Using such an evaluation input, the application analyzes a parameter associated with the ease of using the solution media (block 604).

As another example, the application may receive an end-user input, which evaluates the delivery performance and/or the utility of the solution on the receiving end. Using such an evaluation input, the application analyzes a parameter associated with transmission method performance and/or the ease of using the solution media (block 606).

From the analyses of blocks 602, 604, 606, or some combination thereof, the application adjusts an influence or weight associated with a contextual factor, preference, complexity factor, or input mode, to change a way the media and/or mode of communication for the solution is selected (block 608). The application has thus self-learned from the solution it delivered to an actual problem. The application ends process 600 thereafter, or exits at exit "B" to enter process 500 of FIG. 5 at corresponding entrance "B".

Thus, a computer implemented method is provided in the illustrative embodiments for self-learning contextual modality selection for cognitive solution delivery and other related features, functions, or operations. Where an embodiment or a portion thereof is described with respect to a type of device, the computer implemented method, or a portion thereof, is adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
computing, at an application executing using a processor and a memory, from an input, a problem context, the problem context comprising a set of problem factors, the input comprising a problem to be solved using a cognitive system;
computing, at the application, from the input, a user context, the user context comprising a set of user factors;
determining a type of media corresponding to a complexity of a cognitive solution received from the cognitive system, wherein the cognitive solution is responsive to the problem;
determining, using a problem factor from the set of problem factors, using a user factor in the set of user factors, and the complexity, a mode of communication;
adjusting a communication apparatus to cause a data communication to occur, wherein the data communication delivers the cognitive solution in the type of media using the mode of communication;
instrumenting the cognitive solution with an evaluation code;
receiving, after the data communication has ended, an evaluation input from the evaluation code, wherein the evaluation input has a value corresponding to a delivery performance of the cognitive solution over the data communication using the mode of communication;
changing a weight of one or more of (i) a problem factor in the set of problem factors, (ii) a user factor in the set of user factors, (iii) a second mode of communication of the input, and (iv) the complexity; and
causing, responsive to the changing, the communication apparatus to transmit a second cognitive solution responsive to a second problem in the type of media using a third mode of communication.

2. The method of claim 1, wherein the mode of communication is different from a second mode of communication of the input.

3. The method of claim 1, wherein the mode of communication is determined further responsive to a preference, wherein the preference is a user preference.

4. The method of claim 1, wherein the mode of communication is determined further responsive to a preference, wherein the preference is a group preference of a user group that includes a sender of the input.

5. The method of claim 1, wherein a user factor in the set of user factors of the user context is a location of a sender of the input relative to a system affected by the problem.

6. The method of claim 1, wherein a user factor in the set of user factors of the user context is a change in a location of a sender indicative of a mobility of the user.

7. The method of claim 1, wherein a user factor in the set of user factors of the user context is a type of data communication network used to provide the input.

8. The method of claim 1, wherein a user factor in the set of user factors of the user context is a time delay between an occurrence of the problem and a time of sending the input.

9. The method of claim 1, wherein a user factor in the set of user factors of the user context is a level of detail in the input to describe the problem.

10. The method of claim 1, wherein a problem factor in the set of problem factors of the problem context is a mode of communication that is used in the transmitting the input to the cognitive system.

11. The method of claim 1, wherein a problem factor in the set of problem factors of the problem context is a bandwidth available in a mode of communication that is used in the transmitting the input to the cognitive system.

12. The method of claim 1, wherein a problem factor in the set of problem factors of the problem context is a type of data that is used in the input.

13. A method comprising:
computing, at an application executing using a processor and a memory, from an input, a problem context, the problem context comprising a set of problem factors, the input comprising a problem to be solved using a cognitive system;
computing, at the application, from the input, a user context, the user context comprising a set of user factors;
determining a type of media corresponding to a complexity of a cognitive solution received from the cognitive system, wherein the cognitive solution is responsive to the problem;
determining, using a problem factor from the set of problem factors, using a user factor in the set of user factors, and the complexity, a mode of communication;
adjusting a communication apparatus to cause a data communication to occur, wherein the data communication delivers the cognitive solution in the type of media using the mode of communication;
instrumenting the cognitive solution with an evaluation code;
receiving, after the data communication has ended, an evaluation input from the evaluation code, wherein the evaluation input has a value corresponding to an ease of using the type of media of the cognitive solution over the data communication using the mode of communication;
changing a weight of one or (i) a problem factor in the set of problem factors, (ii) a user factor in the set of user factors, (iii) a second mode of communication of the input, and (iv) the complexity; and
causing, responsive to the changing, selection of a second type of media corresponding to a second cognitive solution responsive to a second problem for transmitting using the mode of communication.

14. A method comprising:
computing, at an application executing using a processor and a memory, from an input, a problem context, the problem context comprising a set of problem factors, the input comprising a problem to be solved using a cognitive system;
computing, at the application, from the input, a user context, the user context comprising a set of user factors;
determining a type of media corresponding to a complexity of a cognitive solution received from the cognitive system, wherein the cognitive solution is responsive to the problem;

determining, using a problem factor from the set of problem factors, using a user factor in the set of user factors, and the complexity, a mode of communication;

adjusting a communication apparatus to cause a data communication to occur, wherein the data communication delivers the cognitive solution in the type of media using the mode of communication;

receiving, after the data communication has ended, an evaluation input from an end-user of the cognitive solution, wherein the evaluation input has a value corresponding to an ease of using the type of media of the cognitive solution over the data communication using the mode of communication;

changing a weight of one or more of (i) a problem factor in the set of problem factors, (ii) a user factor in the set of user factors, (iii) a second mode of communication of the input, and (iv) the complexity; and causing, responsive to the changing, selection of a second type of media corresponding to a second cognitive solution responsive to a second problem for transmitting using the mode of communication.

* * * * *